US007722848B2

(12) United States Patent
Dai et al.

(10) Patent No.: US 7,722,848 B2
(45) Date of Patent: May 25, 2010

(54) LITHIUM IRON PHOSPHATE CATHODE MATERIAL

(75) Inventors: Quan Dai, Shenzhen (CN); Julin Shen, Shenzhen (CN)

(73) Assignee: BYD Company Limited (CN)

( * ) Notice: Subject to any disclaimer, the term of this patent is extended or adjusted under 35 U.S.C. 154(b) by 0 days.

(21) Appl. No.: 12/127,431

(22) Filed: May 27, 2008

(65) Prior Publication Data

US 2009/0081102 A1    Mar. 26, 2009

(30) Foreign Application Priority Data

Sep. 25, 2007    (CN)    ........................ 2007 1 0154685

(51) Int. Cl.
*C01B 15/16* (2006.01)
*C01B 25/26* (2006.01)
*H01M 4/485* (2010.01)

(52) U.S. Cl. .................... 423/306; 252/182.1; 423/311; 423/312; 423/594.1; 423/594.2; 429/231.1; 429/231.95

(58) Field of Classification Search ................. 423/306, 423/593.1, 594.1, 594.2, 594.15, 311, 312; 252/182.1; 429/231.1, 231.95
See application file for complete search history.

(56) References Cited

U.S. PATENT DOCUMENTS

| | | | |
|---|---|---|---|
| 3,778,307 A | 12/1973 | Beer et al. | |
| 4,394,280 A | 7/1983 | von Alpen et al. | |
| 5,910,382 A * | 6/1999 | Goodenough et al. | 429/218.1 |
| 6,514,640 B1 | 2/2003 | Armand et al. | |
| 6,558,844 B2 | 5/2003 | Howard, Jr. et al. | |
| 6,645,452 B1 | 11/2003 | Barker et al. | |
| 6,960,331 B2 * | 11/2005 | Barker et al. | 423/306 |
| 6,964,830 B2 | 11/2005 | Takahashi | |
| 7,025,907 B2 | 4/2006 | Kohzaki et al. | |
| 7,172,834 B1 | 2/2007 | Jow et al. | |
| 7,189,475 B2 | 3/2007 | Sasaki et al. | |
| 7,255,965 B2 | 8/2007 | Xu et al. | |
| 2002/0047112 A1 | 4/2002 | Hosoya et al. | |
| 2002/0102459 A1 | 8/2002 | Hosoya et al. | |

(Continued)

FOREIGN PATENT DOCUMENTS

CN    1259773    7/2000

(Continued)

OTHER PUBLICATIONS

Yun et al. "Synthesis and electrochemical properties of olivine-type LiFePO4/C composite cathode material prepared from a poly(vinyl alcohol)-containing precursor." Journal of Power Sources vol. 160, Issue 2, Oct. 6, 2006, pp. 1361-1368. Available online May 9, 2006.*

(Continued)

*Primary Examiner*—Scott Kastler
*Assistant Examiner*—Brian Walck
(74) *Attorney, Agent, or Firm*—Greenberg Traurig, LLP

(57) ABSTRACT

Lithium iron phosphate cathode materials for lithium secondary batteries and methods of preparation thereof are disclosed. Better cathode materials may be produced by multiple annealing and/or heating steps. The annealing step can be carried out before and/or after the heating steps to provide cathode materials, which exhibit superior electrical properties. In some instances, divalent iron compounds are incorporated as starting materials.

21 Claims, 2 Drawing Sheets

U.S. PATENT DOCUMENTS

| | | | |
|---|---|---|---|
| 2003/0064287 A1 | 4/2003 | Masquelier et al. | |
| 2003/0215714 A1 | 11/2003 | Barker et al. | |
| 2004/0005265 A1* | 1/2004 | Chiang et al. | 423/306 |
| 2004/0151649 A1 | 8/2004 | Hemmer et al. | |
| 2005/0233220 A1 | 10/2005 | Gozdz et al. | |
| 2006/0083990 A1 | 4/2006 | Adamson et al. | |
| 2006/0236528 A1 | 10/2006 | Xu et al. | |
| 2007/0160752 A1 | 7/2007 | Mao | |
| 2007/0166609 A1 | 7/2007 | Lee et al. | |
| 2007/0178370 A1 | 8/2007 | Amine et al. | |
| 2007/0184352 A1 | 8/2007 | Donoue et al. | |
| 2007/0207080 A1 | 9/2007 | Yang | |
| 2007/0212606 A1* | 9/2007 | Chang | 429/221 |
| 2009/0106970 A1 | 4/2009 | Fan et al. | |
| 2009/0148765 A1 | 6/2009 | Cao et al. | |
| 2009/0169984 A1 | 7/2009 | Liang et al. | |
| 2009/0191455 A1 | 7/2009 | Gao et al. | |
| 2009/0217512 A1 | 9/2009 | Tian et al. | |
| 2009/0217513 A1 | 9/2009 | Xi et al. | |
| 2009/0220856 A1 | 9/2009 | Tian et al. | |
| 2009/0220860 A1 | 9/2009 | Xi et al. | |
| 2009/0302283 A1 | 12/2009 | Xia et al. | |
| 2010/0028771 A1 | 2/2010 | Zhou et al. | |

FOREIGN PATENT DOCUMENTS

| | | |
|---|---|---|
| CN | 1401559 | 3/2003 |
| CN | 1410349 | 4/2003 |
| CN | 1424980 | 6/2003 |
| CN | 1559889 | 1/2005 |
| CN | 1641912 | 7/2005 |
| CN | 1648036 | 8/2005 |
| CN | 1677718 | 10/2005 |
| CN | 1762798 | 4/2006 |
| CN | 1773754 | 5/2006 |
| CN | 1775665 | 5/2006 |
| CN | 1797823 | 7/2006 |
| CN | 1964125 | 5/2007 |
| CN | 1986395 | 6/2007 |
| CN | 1989649 | 6/2007 |
| CN | 101047268 | 10/2007 |
| CN | 101087021 | 12/2007 |
| CN | 101106189 | 1/2008 |
| CN | 101128950 | 2/2008 |
| CN | 101207197 | 6/2008 |
| CN | 101209827 | 7/2008 |
| CN | 101212048 | 7/2008 |
| CN | 101420048 | 4/2009 |
| CN | 101453019 | 6/2009 |
| CN | 101471432 | 7/2009 |
| CN | 101478041 | 7/2009 |
| CN | 101478042 | 7/2009 |
| CN | 101494305 | 7/2009 |
| EP | 1 553 647 A1 | 7/2005 |
| EP | 1855334 | 11/2007 |
| WO | WO 97/40541 | 10/1997 |
| WO | 2005076936 | 8/2005 |
| WO | 2006066470 | 6/2006 |
| WO | 2006112674 | 10/2006 |
| WO | 2008109734 | 9/2008 |

OTHER PUBLICATIONS

Hu, Huan-yu et al., "Influenece of the Mg-substitution on electrochemical performances of LiFePO4," China Academic Journal Electronic Publishing House, pp. 18-20, vol. 30, No. 1, 2006.

Transaction History of U.S. Appl. No. 12/053,308, filed May 27, 2008, entitled "Cathode Materials for Lithium Batteries.".

Transaction History of U.S. Appl. No. 12/035,978, filed Feb. 2, 2008, entitled "Battery Protection Mechanism.".

Related U.S. Appl. No. 12/035,978, entitled "Lithium Iron Phosphate Cathode Material," Final Office Action (mailed Jan. 9, 2009).

Related U.S. Appl. No. 12/035,978, entitled "Lithium Iron Phosphate Cathode Material ," Non-Final Office Action (mailed Apr. 27, 2009).

Related U.S. Appl. No. 12/035,978, entitled "Lithium Iron Phosphate Cathode Material ," Non-Final Office Action (mailed Oct. 2, 2008).

European Search Report for EP09400001 (mailed Apr. 14, 2009).

International Patent Application Serial No. PCT/CN08/70391, International Search Report and Written Opinion (mailed Jul. 17, 2008).

Pei, Su-hua et al., "Sensitivity of $TiO^2$ : $NB2O5$ composite crystalliod to trimethylamine", Journal of Functional Materials and Devices, vol. 12, No. 3, Jun. 2006.

USPTO Transaction History of related U.S. Appl. No. 12/035,978, filed Feb. 22, 2008, entitled "Lithium Iron Phosphate Cathode Material.".

USPTO Transaction History of related U.S. Appl. No. 12/040,773, filed Feb. 29, 2008, entitled "Composite Compound with Mixed Crystalline Structure.".

USPTO Transaction History of related U.S. Appl. No. 12/053,308, filed Mar. 21, 2008, entitled "Cathode Materials for Lithium Batteries.".

USPTO Transaction History of related U.S. Appl. No. 12/198,087, filed Aug. 25, 2008, entitled "Lithium-Ion Rechargeable Battery Preparation.".

USPTO Transaction History of related U.S. Appl. No. 12/254,537, filed Oct. 20, 2008, entitled "Lithium Iron(II) Phosphate Cathode Active Material.".

USPTO Transaction History of related U.S. Appl. No. 12/482,690, filed Jun. 11, 2009, entitled "Electrolyte for Lithium Batteries.".

USPTO Transaction History of related U.S. Appl. No. 12/273,649, filed Nov. 19, 2008, entitled "Composite Separator Films for Lithium-Ion Batteries.".

USPTO Transaction History of related U.S. Appl. No. 12/316,165, filed Dec. 9, 2008, entitled "Composite Compound with Mixed Crystalline Structure.".

USPTO Transaction History of related U.S. Appl. No. 12/316,173, filed Dec. 9, 2008, entitled "Composite Compound with Mixed Crystalline Structure.".

USPTO Transaction History of related U.S. Appl. No. 12/316,180, filed Dec. 9, 2008, entitled "Composite Compound with Mixed Crystalline Structure.".

USPTO Transaction History of related U.S. Appl. No. 12/316,234, filed Dec. 9, 2008, entitled "Composite Compound with Mixed Crystalline Structure.".

USPTO Transaction History of related U.S. Appl. No. 12/352,981, filed Jan. 13, 2009, entitled "Electrolyte for Batteries and Battery Packs.".

USPTO Transaction History of related U.S. Appl. No. 12/436,347, filed May 6, 2009, entitled "Transition Metal Hydroxide and Oxide, Method of Producing the Same, and Cathode Material Containing the Same.".

Related U.S. Appl. No. 12/035,978, entitled "Lithium Iron Phosphate Cathode Material," Final Office Action (mailed Dec. 7, 2009).

* cited by examiner

LITHIUM IRON PHOSPHATE CATHODE MATERIAL

CROSS REFERENCE TO RELATED APPLICATIONS

This application claims priority to Chinese Patent Application No. 10154685.5 filed Sep. 25, 2007, and is related to commonly owned U.S. patent application Ser. No. 12/035,978 filed Feb. 22, 2008, both of which are incorporated herein by reference.

FIELD OF THE INVENTION

The embodiments of the present invention relate to batteries, more specifically, to a lithium iron phosphate cathode material for lithium secondary batteries.

BACKGROUND

Lithium secondary batteries are widely used and can be found in laptop computers, cameras, camcorders, PDAs, cell phones, iPods and other portable electronic devices. These batteries are also growing in popularity for defense, automotive and aerospace applications because of their high energy density.

Lithium phosphate-based cathode materials for secondary battery have long been known in the battery industry. People have used metal intercalation compound to improve the electrical property of lithium phosphate. One popular intercalation compound is lithium iron phosphate ($LiFePO_4$). Because of its non-toxicity, thermal stability, safety characteristics and good electrochemical performance, there is a growing demand for rechargeable lithium secondary batteries with $LiFePO_4$ as the cathode material.

The present invention teaches a better method of providing a cathode material using lithium metal phosphate salts and other metal intercalation compounds. The prior art methods can result in batteries with varying particle sizes and non-uniform distribution. These non-homogeneous cathode material particles can cause poor electrical properties in the batteries, especially when such requirements are necessary for batteries used in electric vehicles.

As such, there is a need for a better cathode material and method of manufacturing the same for lithium batteries with enhanced electrical performance.

SUMMARY

A first embodiment of the present invention discloses a method of preparing a cathode material for lithium secondary batteries comprising: providing a mixture with at least one lithium compound, at least one divalent iron compound, at least one phosphorous compound and at least one carbon additive; annealing the mixture at a first temperature in an oxygenated atmosphere; and heating the mixture at a second temperature. The first temperature can be from about 60 to 250° C. for 1 to 10 hours while the oxygenated atmosphere includes an oxygen content of at least 21% by volume.

The lithium, divalent iron and phosphorous compounds are able to provide Li:Fe:P molar ratios of about 1-1.05:1:1 while the divalent iron compound and carbon additive are able to provide Fe:C molar ratios of about 1:0.5-1.5. The lithium compound includes one or more members of $Li_2CO_3$, LiOH, $Li_2C_2O_4$, $CH_3COOLi$, $LiH_2PO_4$ and $Li_3PO_4$, the divalent iron compound includes one or more members of ferrous oxalate, ferrous acetate, ferrous chloride and ferrous sulfate, the phosphorous compound includes one or more members of $NH_4H_2PO_4$, $(NH_4)_2HPO_4$, $LiH_2PO_4$, $Li_3PO_4$ and $(NH_4)_3PO_4$, and the carbon additive includes one or more members of benzene naphthalene phenanthrene copolymer, benzene phenanthrene binary copolymer, benzene anthracene binary copolymer, poly benzene, soluble starch, polyvinyl alcohol, sucrose, glucose, urea, phenolic resin, furfural resin, artificial graphite, natural graphite, superconducting acetylene black, acetylene black and mesocarbon microbeads. In some instances, the mixture may be grounded or milled before or after the annealing step. Additionally, the mixture may be heated at a third temperature after the first heating step, wherein the third temperature is higher than the second temperature. The mixture may be further annealed at a fourth temperature in said oxygenated atmosphere after the second heating step, wherein said oxygenated atmosphere includes an oxygen content of at least 21% by volume.

In another embodiment, at least one metal compound can be added to the mixture, the metal compounds including one or more members of oxides, hydroxides, chlorides, nitrates, carbonates, sulfates and salts of Mg, Cr, Ca and Zr, and wherein the lithium, metal, divalent iron and phosphorous compounds are able to provide Li:M:Fe:P molar ratios of 1-1.05:X:1−X:1, wherein $0<X\leq0.3$.

In another embodiment, the annealing step can take place after the heating process. In other words, the mixture can first be heated at a first temperature and subsequently annealed at a second temperature in an oxygenated atmosphere. The mixture may be further heated at a third temperature followed by another annealing step at a fourth temperature in the oxygenated atmosphere.

In other embodiments, multiple annealing and heating processes may be incorporated, wherein the annealing steps can take place before and after the heating process. In one embodiment, a first annealing step is followed by a first heating step, which is then followed by a second annealing step. The mixture can be further subjected to a second heating step followed by a third annealing step. It will be appreciated by one skilled in the art that other permutations may be adopted.

Other variations, embodiments and features of the present invention will become evident from the following detailed description, drawings and claims.

DETAILED DESCRIPTION

Figure 1:
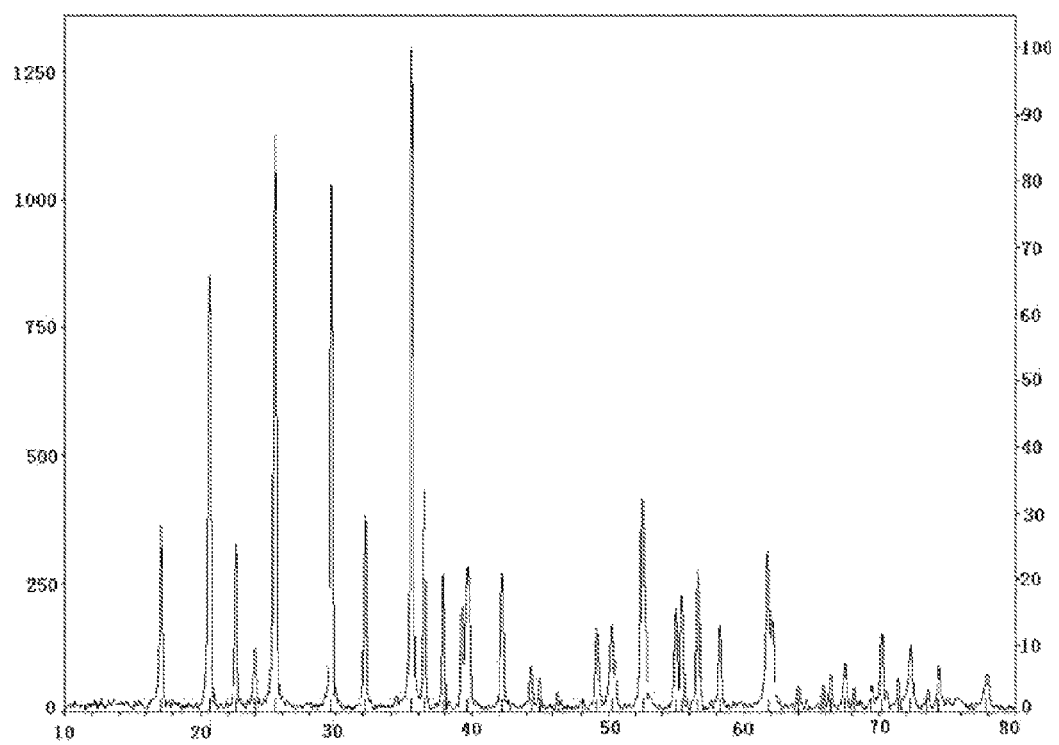
FIG. 1 illustrates an x-ray diffraction (XRD) pattern of a lithium iron phosphate cathode material according to one embodiment of the present invention.

It will be appreciated by those of ordinary skill in the art that the invention can be embodied in other specific forms without departing from the spirit or essential character thereof. The presently disclosed embodiments are therefore considered in all respects to be illustrative and not restrictive.

The present invention provides a new method for preparing the cathode material for lithium secondary batteries, as well as new composition of materials used in the new method. The invention utilizes one or more annealing processes in a way to enhance the electrical properties of the cathode material. The thermal process is able to more evenly distribute the carbon additives among the chemical precursors of lithium iron phosphate particles. The thermal process, in addition to distributing the layer of conductive carbon material among the lithium iron phosphate particles, also helps to promote uniform particle distributions, predictable particle sizes and the desired homogeneity of the composite cathode material.

The cathode material that the present invention produces exhibits superior particle homogeneity and high electrical capacity especially during high electrical discharges. Such cathode materials are better suited for applications including without limitations electrical vehicles and notebook computers.

The general procedure of the invention calls for a method of preparing a lithium iron phosphate cathode active material for lithium secondary batteries, the method including mixing one or more divalent iron compound, phosphorous compound, lithium compound and carbon additive, and heating or sintering the mixture to a first temperature under an inert gas or gas mixture atmosphere. Subsequently, the sintered mixture can be grinded or milled, dried, and then heated or sintered to a second temperature to produce the desired lithium iron phosphate composite material. The method further includes annealing the mixture at temperatures of between 60 to 250° C. in an oxidizing atmosphere before and/or after the first sintering step. In this embodiment, the first sintering temperature can vary from about 300 to 600° C. for 3 to 12 hours while the second sintering temperature can vary from about 700 to 900° C. for 5 to 20 hours. In this instance, annealing involves thermal treatment of the mixture in an oxygenated environment.

As discussed above, the present method includes annealing the mixture in an oxygenated atmosphere before and/or after the first sintering step. The annealing process may be necessary after the first sintering step because of possible air bubbles in the mixture after the sintering process. Similarly, subjecting the mixture to an annealing process before the first sintering step may cause air bubbles to form thereby impacting the structure of the lithium iron phosphate composite particles. At the same time, after the first sintering step, the inert or protective atmosphere may be terminated to carry out the oxygenated atmosphere for annealing purposes such that the heating process ensures that the mixture will not be subjected to a rapid decrease in temperature. In other words, the transition between the annealing and sintering processes can be smoothly carried out to minimize rapid thermal changes. In doing so, the processing steps can continue to achieve the necessary energy savings.

There are no limitations to the thermal conditions of the presently disclosed embodiments. Temperatures that are too high may lead to carbon combustion, while temperatures that are too low may lead to incomplete oxidation of the divalent iron compound. Accordingly, the thermal process can be carried out at temperatures ranging from about 60 to 250° C. for 1 to 10 hours with the oxygenated atmosphere having an oxygen content of at least 21% by volume. These parameters are able to allow the divalent iron to convert or oxidize to trivalent iron without exhausting or prematurely consuming the carbon additives. Additionally, there are no limitations to the types of oxygenated atmosphere including providing an oxygen flow to carry out the thermal process as described above.

In these embodiments, the lithium, divalent iron and phosphorous compounds are able to provide Li:Fe:P molar ratios of 1-1.05:1:1. Further, the amount of carbon additive and divalent iron compound is able to provide Fe:C molar ratios of 1:0.5-1.5. The lithium compound includes one or more members of $Li_2CO_3$, $LiOH$, $Li_2C_2O_4$, $CH_3COOLi$, $LiH_2PO_4$ and $Li_3PO_4$, the divalent iron compound includes one or more members of ferrous oxalate, ferrous acetate, ferrous chloride and ferrous sulfate, the phosphorous compound includes one or more members of $NH_4H_2PO_4$, $(NH_4)_2HPO_4$, $LiH_2PO_4$, $Li_3PO_4$ and $(NH_4)_3PO_4$, and the carbon additive includes one or more members of benzene naphthalene phenanthrene copolymer, benzene phenanthrene binary copolymer, benzene anthracene binary copolymer, poly benzene, soluble starch, polyvinyl alcohol, sucrose, glucose, urea, phenolic resin, furfural resin, artificial graphite, natural graphite, superconducting acetylene black, acetylene black and mesocarbon microbeads. It will be understood that other lithium, divalent iron and phosphorous compounds and carbon additives known in the art may be incorporated.

The lithium, divalent iron and phosphorous compounds and carbon additives can be mixed and grinded by suitable ball milling machines and techniques as known in the art. In one instance, the ball milling method includes mixing the lithium, divalent iron and phosphorous compounds and carbon additives in an organic solvent, and grinding the mixture in a ball milling machine. The organic solvent can be ethanol and/or alcohol while the ratio of organic solvent to weight of mixture can be about 1-2:1. It will be appreciated that other types and amount of organic solvent can be utilized as understood by those skilled in the art. In one example, the ball milling speed can range from 500 to 1000 revolutions per minute while the ball milling time can range from 20 to 72 hours. Other speeds and duration can be anticipated. In one embodiment, the ball milling machine includes a high-energy ball milling device such as a planetary ball mill, which may possibly provide better control of the particle size by providing small particles capable of adhering in between larger particles thereby increasing the tap density of the material. In some embodiments, other ball milling machines capable of controlling the particle size and distribution of such particles may also be utilized.

The presently disclosed embodiments can be carried out under a protective atmosphere with an inert or reducing gas or gas mixture. The inert or reducing atmosphere has gases or gas mixtures that will not react with the product of a chemical reaction including the likes of hydrogen, nitrogen, carbon monoxide, decomposed ammonia, and inert gases such as helium, neon, argon, krypton, xenon and radon. In one instance, the flow of the inert or reducing gas can be static. In other instances, the gas can be flowing at a rate of about 2 to 50 L/min. It will be appreciated that other milling or grinding techniques including methods of heating, sintering or drying of the mixtures with and/or without inert atmosphere can be incorporated as understood by one skilled in the art.

In other embodiments, metal compounds may be added to the lithium compound, divalent iron compound, phosphorous compound and carbon additive mixtures of the presently disclosed embodiments, the metal compounds including one or more members of oxides, hydroxides, chlorides, nitrates, carbonates, sulfates and salts of Mg, Cr, Ca and Zr. In one instance, the lithium, metal, divalent iron and phosphorous compounds are able to provide Li:M:Fe:P molar ratios of 1-1.05:X:1−X:1, wherein $0<x\leqq0.3$. Furthermore, the amount of divalent iron compound and carbon additive that can be incorporated is capable of providing Fe:C molar ratios of 1:0.5-1.5.

The following are various embodiments of the lithium iron phosphate ($LiFePO_4$) composite cathode material according to the presently disclosed invention.

EXAMPLE 1

(1) Mix 185 grams of $Li_2CO_3$, 900 grams of ferrous oxalate, 575 grams of $NH_4H_2PO_4$, 150 grams of glucose and 2000 mL anhydrous ethanol to provide Li:Fe:P molar ratio of 1:1:1, grind the mixture in a planetary ball mill for 24 hours, remove and dry at 70° C.;

(2) Under the protection of argon gas and at a heating rate of 2° C./min up to 500° C., sinter the mixture at said temperature for 4 hours;

(3) Cool the mixture to 200° C., expose to oxygen and heat at said temperature for 2 hours, allow ambient cooling to room temperature;

(4) Add 1000 mL of ethanol to the mixture, grind the mixture in a planetary ball mill for 1.5 hours, remove and dry at 70° C.; and (5) Under the protection of argon gas and at a heating rate of 10° C./min up to 750° C., sinter the mixture at said temperature for 15 hours, allow ambient cooling to provide a lithium iron phosphate composite material having a tap density of 1.12 g/mL.

Figure 2:
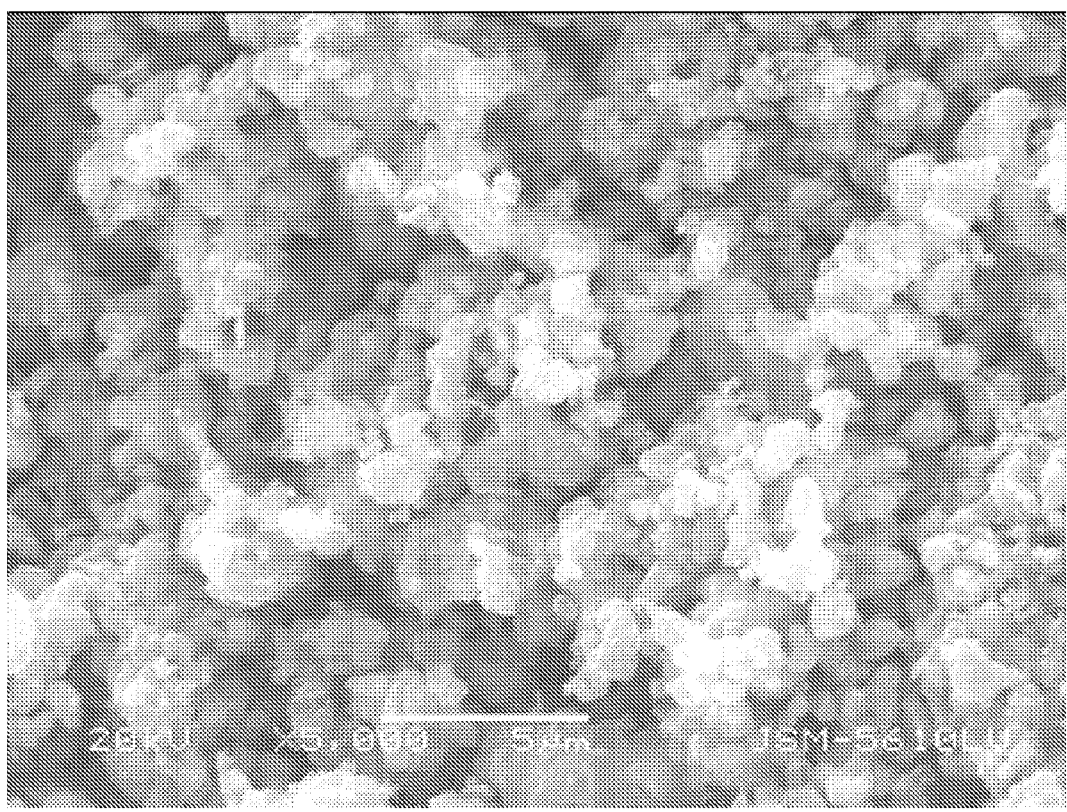
FIG. 2 illustrates a scanning electron microscope (SEM) image of the lithium iron phosphate cathode material of FIG. 1.

An x-ray diffraction (XRD) pattern of the lithium iron phosphate cathode material was carried out with a Rigaku D/MAX-2200 as shown in FIG. 1, while a scanning electron microscope (SEM) image was performed on a Shimadzu SSX-550 as shown in FIG. 2.

EXAMPLE 2

(1) Mix 520 grams of $LiH_2PO_4$, 900 grams of ferrous oxalate, 745 grams of $(NH_4)_3PO_4$, 90 grams of acetylene black and 2000 mL anhydrous ethanol to provide Li:Fe:P molar ratio of 1:1:1, grind the mixture in a planetary ball mill for 35 hours, remove and dry at 70° C.;

(2) Under the protection of argon gas and at a heating rate of 2° C./min up to 350° C., sinter the mixture at said temperature for 8 hours;

(3) Cool the mixture to 150° C., expose to oxygen and heat for 5 hours, allow ambient cooling to room temperature;

(4) Add 1000 mL of ethanol to the mixture, grind the mixture in a planetary ball mill for 1 hour, remove and dry at 70° C.; and (5) Under the protection of argon gas and at a heating rate of 10° C./min up to 850° C., sinter the mixture at said temperature for 8 hours, allow ambient cooling to provide a lithium iron phosphate composite material having a tap density of 1.08 g/mL.

EXAMPLE 3

(1) Mix 520 grams of $LiH_2PO_4$, 873 grams of ferrous oxalate, 745 grams of $(NH_4)_3PO_4$, 150 grams of $CaCO_3$, 30 grams of natural graphite and 2000 mL anhydrous ethanol to provide Li:Ca:Fe:P molar ratio of 1:0.03:0.97:1, grind the mixture in a planetary ball mill for 30 hours, remove and dry at 70° C.;

(2) Under the protection of argon gas and at a heating rate of 2° C./min up to 450° C., sinter the mixture at said temperature for 7 hours;

(3) Cool the mixture to 100° C., expose to oxygen and heat for 8 hours, allow ambient cooling to room temperature;

(4) Add 1000 mL of ethanol to the mixture, grind the mixture in a planetary ball mill for 1 hour, remove and dry at 70° C.; and (5) Under the protection of argon gas and at a heating rate of 10° C./min up to 800° C., sinter the mixture at said temperature for 10 hours, allow ambient cooling to provide a lithium iron phosphate composite material having a tap density of 1.10 g/mL.

EXAMPLE 4

(1) Mix 120 grams of LiOH, 891 grams of ferrous oxalate, 660 grams of $(NH_4)_2HPO_4$, 2.9 grams of $Mg(OH)_2$, 130 grams of sucrose and 2000 mL anhydrous alcohol to provide Li:Mg:Fe:P molar ratio of 1:0.01:0.99:1, grind the mixture in a planetary ball mill for 25 hours, remove and dry at 70° C.;

(2) Increase temperature to 100° C., expose to oxygen and heat the mixture at said temperature for 8 hours, and allow ambient cooling to room temperature;

(3) Under the protection of argon gas and at a heating rate of 2° C./min up to 450° C., sinter the mixture at said temperature for 7 hours;

(4) Add 1000 mL of ethanol to the mixture, grind the mixture in a planetary ball mill for 1 hour, remove and dry at 70° C.; and (5) Under the protection of argon gas and at a heating rate of 10° C./min up to 800° C., sinter the mixture at said temperature for 10 hours, allow ambient cooling to provide a lithium iron phosphate composite material having a tap density of 1.11 g/mL.

Reference 5

(1) Mix 185 grams of $Li_2CO_3$, 720 grams of ferrous oxalate, 575 grams of $NH_4H_2PO_4$, 150 grams of glucose and 2000 mL anhydrous ethanol to provide Li:Fe:P molar ratio of 1:1:1, grind the mixture in a planetary ball mill for 24 hours, remove and dry at 70° C.; and (2) Under the protection of argon gas and at a heating rate of 2° C./min up to 500° C., sinter the mixture at said temperature for 4 hours, and allow ambient cooling to provide a $LiFePO_4$ composite material having a tap density of 0.78 g/mL.

Testing of Examples 1-4 and Reference 5

(1) Battery Preparation (a) Cathode Active Material

Separately combine 100 grams of each of the lithium iron phosphate ($LiFePO_4$) composite material from examples 14 and reference 5 with 3 grams of polyvinylidene fluoride (PVDF) binder material and 2 grams of acetylene black to 50 grams of N-methylpyrrolidone (NMP), mix in a vacuum mixer into a uniform slurry, apply a coating of about 20 microns thick of the slurry to each side of an aluminum foil, dry at 150° C., roll and crop to a size of 540×43.5 $mm^2$ to provide about 2.8 grams of $LiFePO_4$ as the cathode active material.

(b) Anode Active Material

Combine 100 grams of natural graphite with 3 grams of polyvinylidene fluoride (PVDF) binder material and 3 grams of acetylene black conductive agent to 100 grams of N-methylpyrrolidone (NMP), mix in a vacuum mixer into a uniform slurry, apply a coating of about 12 microns thick to each side of a copper foil, dry at 90° C., roll and crop to a size of 500×44 $mm^2$ to provide about 2.6 grams of natural graphite as the anode active ingredient.

(c) Battery Assembly

Separately wind each of the cathode and anode active materials with polypropylene film into a square-shaped lithium battery core, followed by dissolving 1M $LiPF_6$ in a mixture of non-aqueous electrolyte solvent EC/EMC/DEC=1:1:1, inject and seal the electrolyte having a capacity of 3.8 g/Ah into the battery core to provide lithium secondary batteries for the testing of examples 1-4 and reference 5.

(2) Testing Cycle (a) Performance Test

Place each of the lithium secondary batteries 1-5 on a test cabinet. Using a constant current charge of 0.2C with an upper limit of 3.8 volts, charge each battery for 2.5 hours at constant voltage and set aside for 20 minutes. Using a current of 0.2C discharge from 3.8 volts to 3.0 volts, record the battery's initial discharge capacity and then use the following equation to calculate the battery's volumetric capacity. Volumetric capacity=Initial discharge capacity (mAh)/Volume of cathode material ($cm^3$)

Using a constant current charge of 0.2C with an upper limit of 3.8 volts, charge each battery for 2.5 hours at constant voltage and set aside for 20 minutes. Separately use currents of 1C, 2C and 5C with discharges from 3.8 volts to 3.0 volts, record the battery discharge capacity relative to the discharge capacity at 0.2C to provide discharge capacity ratios, namely:

$C_{1C}/C_{0.2C}$: Current discharge capacity of 1C from 3.8 volts to 3.0 volts relative to current discharge capacity of 0.2C from 3.8 volts to 3.0 volts;

$C_{2C}/C_{0.2C}$: Current discharge capacity of 2C from 3.8 volts to 3.0 volts relative to current discharge capacity of 0.2C from 3.8 volts to 3.0 volts; and $C_{5C}/C_{0.2C}$: Current discharge capacity of 5C from 3.8 volts to 3.0 volts relative to current discharge capacity of 0.2C from 3.8 volts to 3.0 volts.

The test results of examples 1-4 and reference 5 are shown in Table 1.

TABLE 1

Test results of $LiFePO_4$ composite materials 1-4 and reference sample 5.

| Sample number | Initial discharge capacity (mAh) | Volumetric capacity (mAh/cm³) | Discharge performance | | |
|---|---|---|---|---|---|
| | | | $C_{1C}/C_{0.2C}$ (%) | $C_{2C}/C_{0.2C}$ (%) | $C_{5C}/C_{0.2C}$ (%) |
| 1 | 145 | 162 | 98 | 95 | 93 |
| 2 | 143 | 154 | 98 | 95 | 92 |
| 3 | 141 | 155 | 98 | 96 | 91 |
| 4 | 142 | 158 | 98 | 96 | 91 |
| 5 | 142 | 111 | 98 | 90 | 82 |

Reference is now made to FIG. 1 illustrating an x-ray diffraction (XRD) pattern of the lithium iron phosphate cathode material according to example 1 of the presently disclosed embodiment having olivine-type crystal structure and good crystal growth and development.

Reference is now made to FIG. 2 illustrating a scanning electron microscope (SEM) image at 5000× magnification of a lithium iron phosphate cathode material according to example 1 of the presently disclosed embodiment. From the figure, it can be observed that the crystals of the $LiFePO_4$ composite cathode material are relatively uniform in size with relatively uniform particle distribution throughout.

From the data in Table 1, it can be observed that the $LiFePO_4$ composite cathode materials according to examples 1-4 of the present embodiments can provide higher volumetric capacity than reference 5. Further, the large current discharge performances of examples 1-4 maintained, on average, greater than 98%, 95% and 91% at 1C, 2C, and 5C discharge currents, respectively. Accordingly, the lithium iron phosphate cathode materials for lithium secondary batteries and methods of manufacturing such according to the presently disclosed embodiments are capable of providing superior performance relative to the reference sample and other similar lithium iron phosphate cathode materials currently on the market.

Presently disclosed embodiments including divalent iron compounds are easier to be pulverized to provide more uniform and homogenous lithium iron phosphate particles. With the various annealing, heating and sintering processes, the carbon content can be more evenly distributed among the lithium iron phosphate particles thereby providing a cathode material with higher tap density, higher volumetric capacity, and overall enhanced electrical properties.

Although the invention has been described in detail with reference to several embodiments, additional variations and modifications exist within the scope and spirit of the invention as described and defined in the following claims.

What is claimed is:

1. A method of preparing a cathode material for lithium secondary batteries comprising:
    providing a mixture with at least one lithium compound, at least one divalent iron compound, at least one phosphorous compound and at least one carbon additive;
    first drying the mixture at a first temperature;
    second annealing the mixture at a second temperature in an oxygenated atmosphere, wherein the second temperature is higher than the first temperature, and wherein the second temperature is in the range of from about 150° C. to about 250° C.;
    third heating the mixture at a third temperature; and
    fourth heating the mixture at a fourth temperature in an inert atmosphere, wherein the fourth temperature is higher than the third temperature, and wherein the fourth temperature is from about 700° C. to about 900° C.

2. The method of claim 1, wherein the second annealing step occurs for about 1 to about 10 hours.

3. The method of claim 1, wherein the oxygenated atmosphere includes an oxygen content of at least 21% by volume.

4. The method of claim 1, wherein the lithium, divalent iron and Phosphorous compounds provide Li:Fe:P molar ratios of about 1-1.05:1:1 and the divalent iron compound and carbon additive provide Fe:C molar ratios of about 1:0.5-1.5.

5. The method of claim 1, further comprising grinding the mixture before or after the second annealing step.

6. The method of claim 1, further comprising providing at least one metal compound to the mixture, the metal compounds including one or more members of oxides, hydroxides, chlorides, nitrates, carbonates, sulfates and salts of Mg, Cr, Ca and Zr, and wherein the lithium, metal, divalent iron and phosphorous compounds are able to provide Li:M:Fe:P molar ratios of 1-1.05:X:1-X:1, wherein 0<X≦0.3.

7. The method of claim 1, wherein the third heating step occurs under an inert atmosphere.

8. A method of preparing a cathode material for lithium secondary batteries comprising:
    providing a mixture with at least one lithium compound, at least one divalent iron compound, at least one phosphorous compound and at least one carbon additive;
    first drying the mixture at a first temperature;
    second heating the mixture at a second temperature;
    third annealing the mixture at a third temperature in an oxygenated atmosphere; wherein the third temperature is higher than the first temperature, and wherein the third temperature is in the range of from about 150° C. to about 250° C.; and
    fourth heating the mixture at a fourth temperature, wherein the fourth temperature is higher than the second temperature, and wherein the fourth temperature is from about 700 ° C. to about 900° C.

9. The method of claim 8, wherein the third annealing step occurs for about 1 to 10 hours.

10. The method of claim 8, wherein the oxygenated atmosphere includes an oxygen content of at least 21% by volume.

11. The method of claim 8, wherein the lithium, divalent iron and phosphorous compounds provide Li:Fe:P molar ratios of about 1-1.05:1:1 and the divalent iron compound and carbon additive provide Fe:C molar ratios of about 1:0.5-1.5.

12. The method of claim 8, further comprising grinding the mixture before or after the third annealing step.

13. The method of claim 8, further comprising providing at least one metal compound to the mixture, the metal compounds including one or more members of oxides, hydroxides, chlorides, nitrates, carbonates, sulfates and salts of Mg, Cr, Ca and Zr, and wherein the lithium, metal, divalent iron and phosphorous compounds are able to provide Li:M:Fe:P molar ratios of 1-1.05:X:1-X:1, wherein $0<X\leqq0.3$.

14. The method of claim 8, wherein the second and fourth heating steps occur under an inert atmosphere.

15. A method of preparing a cathode material for lithium secondary batteries comprising:
   providing a mixture with at least one lithium compound, at least one divalent iron compound, at least one phosphorous compound and at least one carbon additive;
   first drying the mixture at a temperature;
   second annealing the mixture at a second temperature in a first oxygenated atmosphere, wherein the second temperature is higher than the first temperature, and wherein the second temperature is in the range of from 150° C. to about 250° C.;
   third heating the mixture at a third temperature;
   fourth annealing the mixture at a fourth temperature in a second oxygenated atmosphere; and
   fifth heating the mixture at a fifth temperature, wherein the fifth temperature is higher than the third temperature, and wherein the fifth temperature is from about 700° C. to about 900° C.

16. The method of claim 15, wherein the second and fourth annealing steps each occurs for about 1 about 10 hours.

17. The method of claim 15, wherein the first and second oxygenated atmospheres each includes an oxygen content of at least 21% by volume.

18. The method of claim 15, wherein the lithium, divalent iron and phosphorous compounds provide Li:F:P molar ratios of about 1-1.05:1:1 and the divalent iron compound and carbon additive provide Fe:C molar ratios of about 1:0.5-1.5.

19. The method of claim 15, further comprising grinding the mixture before or after each of the second and fourth annealing steps.

20. The method of claim 15, further comprising providing at least one metal compound to the mixture, the metal compounds including one or more members of oxides, hydroxides, chlorides, nitrates, carbonates, sulfates and salts of Mg, Cr, Ca and Zr, and wherein the lithium, metal, divalent iron and phosphorous compounds are able to provide Li:M:Fe:P molar ratios of 1-1.05:X:1-X:1, wherein $0<X\leqq0.3$.

21. The method of claim 15, wherein the third and fifth heating steps each occurs under an inert atmosphere.

* * * * *